(12) United States Patent
Ramadan et al.

(10) Patent No.: US 11,937,600 B1
(45) Date of Patent: Mar. 26, 2024

(54) SEED GERMINATION ACTIVATOR FOR CONTROL OF BROOMRAPE

(71) Applicant: KING FAISAL UNIVERSITY, Hofouf (SA)

(72) Inventors: Khaled Mohamed Amen Ramadan, Hofouf (SA); Hossam El-Din Saad El-Beltagi, Hofouf (SA); Hani Saber Sayed Saudy, Hofouf (SA); Ahmed Zein El-Abdein Abdel Azeiz, Hofouf (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/121,238

(22) Filed: Mar. 14, 2023

(51) Int. Cl.
*A01N 25/30* (2006.01)
*A01N 37/10* (2006.01)

(52) U.S. Cl.
CPC .............. *A01N 25/30* (2013.01); *A01N 37/10* (2013.01)

(58) Field of Classification Search
CPC ....... A61K 31/216; A01N 25/30; A01N 37/10
See application file for complete search history.

(56) References Cited

FOREIGN PATENT DOCUMENTS

| CN | 101461800 A | * | 6/2009 | | |
|---|---|---|---|---|---|
| CN | 110615784 A | | 12/2019 | | |
| CN | 112425611 A | | 3/2021 | | |
| ES | 2083927 A1 | * | 4/1996 | | |
| ES | 2083927 A1 | | 4/1996 | | |
| TW | I751766 B | * | 1/2022 | | |
| WO | WO-2012120364 A2 | * | 9/2012 | ........... | A61K 9/1635 |

OTHER PUBLICATIONS

Liao (Sustainability vol. 11 pp. 1-16 published 2019). (Year: 2019).*
Aisa (Arab University Journal of Agricultural Science vol. 27 pp. 1399-1404. Published 2019) (Year: 2019).*
Mohammed et al., "Butyl—Iso-Butyl Phthalate as an Orbanche Crenata Seed Germination Activator Secreted by Roots of Vicia Faba," J. Biol. Chem. Environ. Sci., 2013, vol. 8(4): 157-167.
Hamed et al., "Preliminary Study for Testing the Significance of Butyl-Isobutyl Phthalate in Controlling Faba Bean Broomrape," Arab Univ. J. Agric. Sci., Ain Shams Univ., Cairo, Egypt 27 ( 2 ), 2019.

* cited by examiner

*Primary Examiner* — Theodore R. Howell
*Assistant Examiner* — George W Kosturko
(74) *Attorney, Agent, or Firm* — Nath, Goldberg & Meyer; Richard C. Litman

(57) ABSTRACT

A seed germination activator for control of broomrape includes butylisobutylphthalate (hereinafter "BIP"). A biocontrol composition includes BIP and at least two nonionic surfactants for administration in irrigation water. Methods of controlling broomrape may include administering the biocontrol composition comprising BIP in the irrigation water prior to planting crops.

9 Claims, 2 Drawing Sheets

SEED GERMINATION ACTIVATOR FOR CONTROL OF BROOMRAPE

BACKGROUND

1. Field

The disclosure of the present patent application relates to a seed germination activator for control of broomrape, and particularly, to a method of administering butyl-isonbutyl phthalate to control broomrape.

2. Description of the Related Art

Broomrape is a common name for the genus Orobanche, which includes over 200 species of holoparasitic plants. Broomrape seeds may remain dormant in the soil for many years, until stimulated to germinate by compounds produced by living plant roots. Broomrape seedlings attach to the roots of nearby host plants and deprive the host plant of water and nutrients. Broomrape has been reported to threaten a wide variety of major agricultural crops, including but not limited to tobacco, tomato, carrot, cotton, eggplant, potato, cabbage, bell pepper, sunflower, celery, and beans. Broomrape is recognized to constitute a significant threat to agriculture and in extensively infested areas, Broomrape can cause total crop failure.

Traditional strategies for control of broomrape have included pre-planting of a "trap" crop (which is then disposed of) and treatment with commercial herbicides, paired with growth of herbicide resistant crops. However, the herbicides are both expensive and harmful to the environment, and the growth of a trap crop is time consuming and wasteful. Thus, these traditional strategies for control of broomrape are expensive, time consuming, or ecologically unsound.

Thus, a seed germination activator for control of broomrape solving the aforementioned problems is desired.

SUMMARY

The seed germination activator for control of broomrape includes butylisobutylphthalate (hereinafter "BIP"). BIP can be administered to a field before planting of a crop to protect the crop from harmful effects of broomrape.

In an embodiment, a biocontrol composition comprising BIP can be administered in irrigation water. The biocontrol composition comprising BIP may include BIP and at least two nonionic surfactants. The first nonionic surfactant may be polysorbate 80. The second nonionic surfactant may be any other nonionic surfactant generally known in the art.

In an embodiment, a method of controlling broomrape may include administering a biocontrol composition comprising BIP in the irrigation water prior to planting crops. The method may include administering between 100 ppm and 500 ppm BIP. In certain embodiments, the method may include administering either 300 ppm BIP or 400 ppm BIP.

These and other features of the present subject matter will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
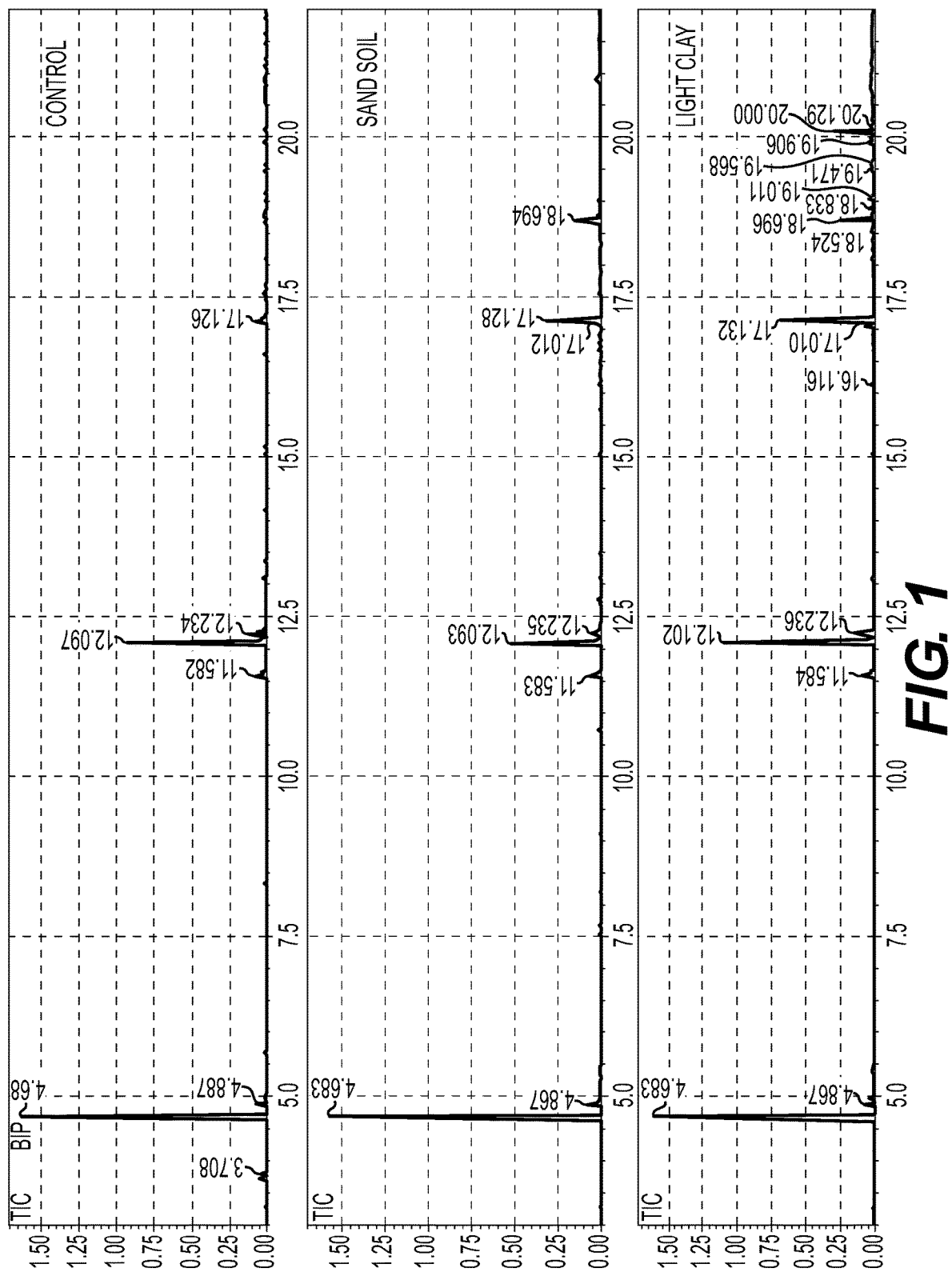
FIG. 1 depicts a chromatogram of BIP phthalate (detected at Rt 4.683 min) extracted from the control sample, sand soil, and light clay soil.

The seed germination activator for control of broomrape includes butylisobutylphthalate (hereinafter "BIP"). BIP is eco-friendly and can be administered in irrigation water to a field before planting of a crop in the field to protect the crop from broomrape damage.

In an embodiment, control of broomrape includes formulating a biocontrol composition comprising BIP, combining the composition with irrigation water or water intended to be used for irrigating the field, and administering the combination or mixture of the biocontrol composition and the irrigation water to the field. For example, the biocontrol composition can be mixed with water to form an aqueous mixture and the aqueous mixture can be used to irrigate the field. The composition comprising BIP may include BIP and at least two nonionic surfactants. The first nonionic surfactant may be polysorbate 80. The second nonionic surfactant may be any suitable nonionic surfactant generally known in the art.

In a further embodiment, the second nonionic surfactant may be a monoglyceride of long-chain fatty acids, polyoxyethylenated alkyphenol, polyoxyethylenated alcohol, fatty alcohol ethoxylate, alkyl phenol ethoxylate, or fatty acid alkoxylate.

In an embodiment, the second nonionic surfactant can be glyceryl monostearate. (GMS) is a commercial monoglyceride nonionic surfactant used in many industries especially in food and cosmetics industries. GMS does not interfere with BIP or with the seeds of broomrape. The advantage of using GMS is that it is completely natural and could be degraded in the soil.

In an embodiment, the biocontrol composition may be formulated by mixing 10 parts BIP, 4 parts polysorbate 80, and 1 part of a second nonionic surfactant with water.

In an embodiment, a method of controlling broomrape may include administering a composition comprising BIP in the irrigation water prior to planting crops. The method may include administering between 100 ppm and 500 ppm BIP. In certain embodiments, the method may include administering either 300 ppm BIP or 400 ppm BIP.

In a further embodiment, the method may include administering a biocontrol composition according to the present subject matter in irrigation water at a rate of 100 ppm, 200 ppm, 300 ppm, 400 ppm, or 500 ppm.

In an embodiment, the biocontrol composition may be administered to a field between one week and two weeks prior to planting. In a further embodiment, the biocontrol agent may be administered to a field 8-10 days prior to planting. In a further embodiment, the biocontrol agent may be administered to a field 7, 8, 9, 10, 11, 12, 13, or 14 days prior to planting.

In an embodiment, the biocontrol composition may be administered to a field prior to planting a crop that is susceptible to being damaged by broomrape. In a further embodiment, the crop that is susceptible to being damaged by broomrape may be selected from the group consisting of tobacco, tomato, sunflower, faba bean, broad bean, and other legumes, brassicas, carrot, cotton, safflower, potato, brinjal and other solanaceous crops (under solanaceae, fabaceae, brassicaceae, cucurbitaceae, asteraceae, apiaceae, cannabinaceae, linaceae, clover, and alfalfa). In a further embodiment, the crop may be any crop that is determined to be susceptible to being damaged by broomrape.

In an embodiment, the field to be treated may have either sandy soil or light clay soil. As is generally known, soil particles are classified according to their diameters. For example, sand has a diameter of 2 mm-0.02 mm, silt has a diameter of 0.02 mm-0.002 mm, and clay has a diameter of less than 0.002 mm. Sandy soil includes small particles formed by weathering rocks. Sandy soil generally has poor water-holding capacity. For example, sandy soils contain more than 80% sand and less than 20% of silt and clay combined. Clay soils include more than 50% silt and clay. Light clay soil includes 50-80% clay and silt and heavy clay soils include more than 80% clay and silt.

In an embodiment, the method may further involve planting a crop in the field that has been pre-treated with BIP.

These embodiments may be better understood in view of the following Examples.

Example 1

Synthesis of Butyl-Isobutyl Phthalate

The synthetic route used for preparing BIP is a modification of a method first reported by Liu et al (2011). By modification of a synthetic method and optimization of semi-industrial synthetic conditions, BIP was produced as shown in Scheme 1. In brief, in a fully customized 20 L glass reactor (QIYU, Shanghai, China) flushed with 4.5 L of anhydrous 1-butanol (99.8% Sigma-Aldrich) at 5° C. and constant stirring (180 rpm), 150 ml of 99% H2504 (Sigma-Aldrich d, 1.98 g/ml) was added, and when the temperature reached 25° C., 372 g or 2.5 mol of phthalic anhydride powder (99% Sigma-Aldrich) (compound (a) in Scheme 1) was added under stirring to produce a first mixture. This first mixture's temperature was raised to 120° C. and the first mixture was refluxed over 5.5 hrs. Then, the first mixture was cooled to 25° C. and 2 L of cool water was added. Thereafter, 2.5 L of ethyl acetate (b.p. 77.1° C.) was added and stirred and when the resulting second mixture stabilized, the lower aqueous layer was drained from the reactor and collected in an appropriate flask. The organic solvent was then dried over 500 g of anhydrous $Na_2SO_4$ in an outer flask. The aqueous layer was re-extracted with 1.5 L of fresh ethyl acetate and the solvent was added to the previous extract after being dried over anhydrous $Na_2SO_4$. The remaining aqueous layer was discarded, and the recombined dry ethyl acetate extract was reheated (53.3° C. at 184.1 mmHg) in the reactor to distill off the solvent which could be used in a subsequent synthetic batch after re-distillation.

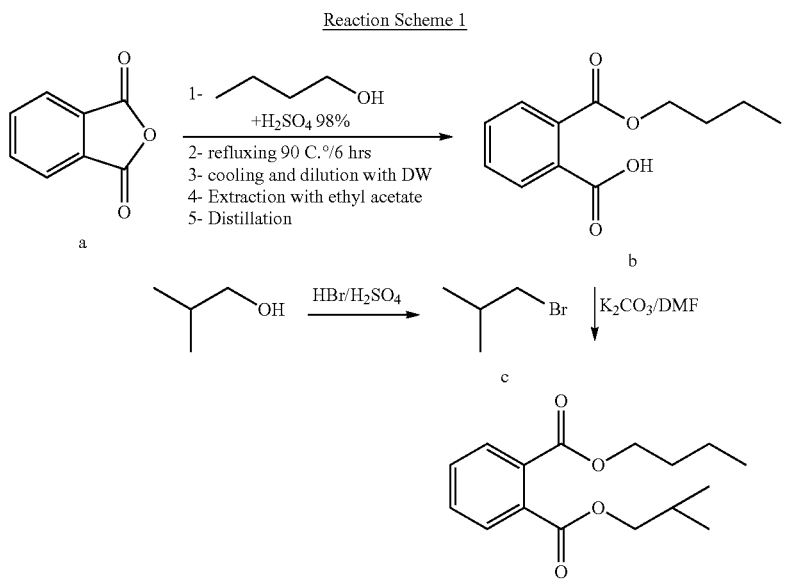

Reaction Scheme 1

The remaining product is the pure compound (b) monobutyl phthalate (yield 79.3%), which is a clear, pale yellowish oil. In the reactor, the compound (b) (400 g, 1.8 mol) was charged to 1.6 L of dry DMF, and then 1-bromo-2-methylpropane (compound c, synthesized as shown in Reaction Scheme 1) (272 g, 2.0 mol) and $K_2CO_3$ (433 g, 3.14 mol) were added. The reaction mixture was stirred (150 rpm) at 60° C. overnight. After cooling to room temperature, the mixture was diluted with deionized water 3.75 L, extracted with EtOAc (1.5 L×2 times) and the organic layer was dried over $Na_2SO_4$. After filtration and concentration, the crude residue was purified by flash column chromatography (10:1 petroleum ether/EtOAc) yielding the target compound (BIP) (325.4 g, 65%) as a colorless oil. The structure of BIP was characterized Mass spectroscopy, $^1HNMR$ and $^{13}CNMR$.

Briefly, the isobutylbromide used above was prepared according to the method described in the Practical Handbook of Org. Chem. (1973). Isobutyl alcohol (2.5 mol) was cooled with liquid nitrogen and treated slowly with 1.25 mole of concentrated sulfuric acid 98% and then with 3.25 moles of hydrogen bromide HBr (in the form of the 48%, constant-boiling, acid), the reaction mixture was boiled, and volatile isobutyl bromide was distilled out from the reaction mixture directly. The distilled crude isobutyl bromide was extracted twice by shaking carefully with about one-fifth of its volume of cold concentrated sulfuric acid in a separating funnel to dissolve the ether produced as a by-product. Crude isobutyl bromide was then washed with deionized water and freed from residue of acid with sodium bicarbonate solution, then washed again with deionized water, dried over calcium chloride, and distilled. The yield of isobutyl bromide was 80%, n20/D 1.435; b.p. 90-92° C.; d=1.26 g/mL at 20° C.

About 325 g of synthesized compounds is required to treat 34,124 m² (8.125 fdan) of infected soil. The cost of producing 500 g of pure butyl isobutyl phthalate according to the previously described synthetic route is 1614 LE (about 86.5 USD). Using the fully customized chemical reactor helped to stabilize the conditions and consequently improved the yield and purity of the obtained compound. The commercial chemicals used, especially the solvents (1-butanol, isobutanol, ethyl acetate and DMF), were applied in the synthesis after extensive distillation and purification. Overall, this method reduced the cost of production by 20%.

A biocontrol agent was formulated by mixing BIP (100 g) with polysorbate 80 (40 g) and a nonionic surfactant (10 g) in 1 L of deionized water. The resulting biocontrol agent was stored in a sealed glass bottle at 5° C. and may be diluted in water to achieve a desired concentration for application to fields.

Example 2

Controlling Broomrape with BIP

Testing was performed to determine the effect of BIP in different plant species as host crops (faba bean, tomato, and potato), soil type (sand soil and light clay soil), application time (late October and late February), and different climatic regions (Al Behera governate and Al Noubareia), using various concentrations of the substrate (100-500 ppm) to increase the inhibitory effect. Results are summarized in Table 1 below. It was found that BIP, added at a rate of 300 ppm of active ingredient in the irrigation water 8-10 days before cultivation in light clay soil for host plants of faba beans and potato and in sand soil for faba bean on the 20th of October, reduced broomrape biomass by 65%. In comparison, treatment with the BIP added at a rate of 400 ppm of active ingredient in irrigation water 10 days before planting in sand soil on the 15th of February for tomato plants resulted in a reduction in broomrape biomass of 69%. Lower concentrations of BIP (100-200 ppm) resulted in reduction of broomrape by about 15%-18%. Increasing the concentration of BIP to 500 ppm increased the inhibition effect to a degree, but the increase did not exceed 10% of the activity observed at 400 ppm. Thus, BIP, when formulated and administered at 100-500 ppm with the irrigation water is an effective bio agent for controlling broomrape.

Example 3

Testing the Degradation Rate of BIP in Soil

Figure 2:
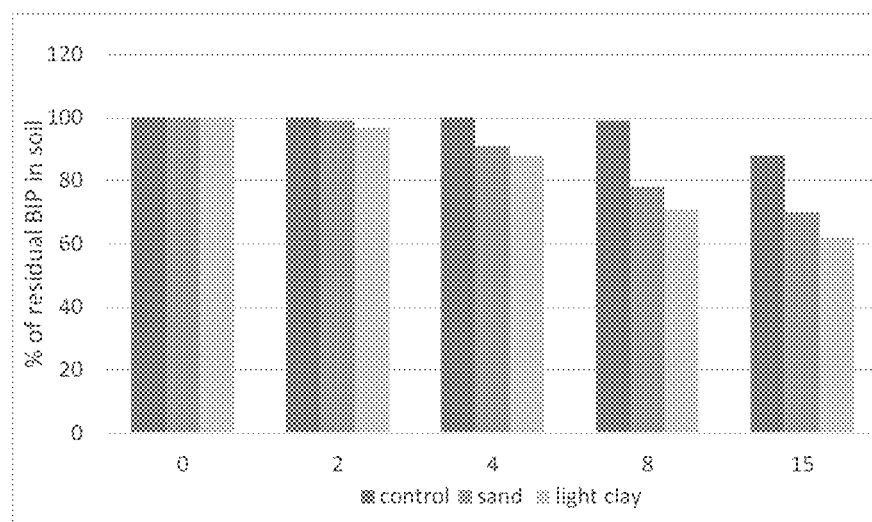
FIG. 2 depicts a graph of the rate of degradation of BIP in various soils.

In three replicate pot experiments, the degradation rate of BIP was tested by HPLC. About 5.0 kg of each of the two soil types (sand and light clay soils) used in this study was divided into three pots for each and treated with 300 ppm of formulated BIP (as described earlier) under the following conditions: Sand soil pH=7.9, Light clay pH=8.2, Incubation temperature, 20° C.±1.2. The control pots contained purified sea sand (purified with conc. HCl and after washing with distilled water, the pH adjusted to 8.0 with $NH_4OH$) treated with 300 ppm of formulated BIP. All pots were incubated in the laboratory for 15 days. Samples were taken at 0, 2, 4, 8, and 15 days. Soil samples were diluted with deionized water and filtered by synthetic fabric textile and then by filter paper Whatman No 1 under vacuum. The filtrate was extracted three times with ethyl acetate (HPLC-grade, Sigma, UK) and the extract was evaporated at 45° C. under reduced pressure, and the residual materials were redissolved in acetonitrile. The extracts were screened by HPLC analysis by using Agilent infinity II HPLC1290 equipped with quaternary pump and variable wavelength diode array detector. Zorbax RP-18 (15×4.6×5 μm) column eluted isocratic with acetonitrile:water 9:1 at 280 nm. The calibration standard curve was made with dibutyl phthalate (5, 75, and 200 ng/μl). The chromatograms, as shown in FIG. 1, illustrate the separation of BIP residue from control, sand soil, and light clay soil samples after treatment (0 time). The graph depicted in FIG. 2 illustrates the degradation of BIP observed over the 15 day period.

It is to be understood that the seed germination activator for control of broomrape is not limited to the specific embodiments described above but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A method of reducing the risk of crop damage from broomrape, comprising administering a mixture consisting of water and a biocontrol composition consisting of butyl-isobutylphthalate and at least two nonionic surfactants to a field prior to planting crops in the field; wherein the at least two nonionic surfactants include polysorbate 80 and glyceryl monostearate.

TABLE 1

% Reduction of Broomrape Biomass in Field Experiment

| Crop | Time of Cultivation | Soil Type | BIP (ppm) | % Reduction Broomrape Biomass | Reference Herbicide |
|---|---|---|---|---|---|
| Faba bean (Misr-3) | October | Sandy Soil | 300 | 59.8 | Glyphosate |
| Faba Bean (Misr-3) | October | Light Clay Soil | 300 | 65.0 | Glyphosate |
| Potato (Yarla) | September | Light Clay Soil | 325 | 62.3 | Graminol |
| Tomato (Star Valley) | February | Sandy Soil | 400 | 71.8 | Metribuzin75 |

2. The method recited in claim 1, wherein the mixture is administered to the field at a concentration sufficient to provide between 100 ppm and 500 ppm butylisobutylphthalate.

3. The method as recited in claim 2, wherein the concentration of butylisobutylphthalate in the mixture is 300 ppm.

4. The method as recited in claim 2, wherein the concentration of butylisobutylphthalate in the mixture is 400 ppm.

5. The method as recited in claim 1, further comprising waiting a period ranging from 7 days to 14 days from administering the biocontrol composition before planting a crop in the field.

6. The method as recited in claim 5, further comprising waiting 8 days after administering the biocontrol composition before planting a crop in the field.

7. The method as recited in claim 5, further comprising waiting 9 days after administering the biocontrol composition before planting a crop in the field.

8. The method as recited in claim 5, further comprising waiting 10 days after administering the biocontrol composition before planting a crop in the field.

9. The method as recited in claim 1, further comprising planting a crop in the field selected from the group consisting of tobacco, tomato, sunflower, faba bean, broad bean, brassicas, carrot, cotton, safflower, potato, brinjal, solanaceae, fabaceae, brassicaceae, cucurbitaceae, asteraceae, apiaceae, cannabinaceae, linaceae, clover, and alfalfa.

\* \* \* \* \*